United States Patent
Petzold et al.

(10) Patent No.: US 7,430,936 B2
(45) Date of Patent: Oct. 7, 2008

(54) METHOD FOR THE CONTROL OF OPERATIONAL SEQUENCING IN AN AUTOMATIC TRANSMISSION OF AUXILIARY CONSTRUCTION

(75) Inventors: Rainer Petzold, Friedrichshafen (DE); Mario Steinborn, Friedrichshafen (DE); Stefan Veittinger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 281 days.

(21) Appl. No.: 11/370,070

(22) Filed: Mar. 7, 2006

(65) Prior Publication Data

US 2006/0213300 A1   Sep. 28, 2006

(30) Foreign Application Priority Data

Mar. 11, 2005 (DE) .................. 10 2005 011 273

(51) Int. Cl.
*F16H 3/38* (2006.01)
(52) U.S. Cl. .............................. 74/339; 74/335; 74/346; 192/3.58; 192/48.2; 192/52.4; 192/87.19; 192/109 F
(58) Field of Classification Search .............. 192/109 F, 192/52.1, 52.4
See application file for complete search history.

(56) References Cited

U.S. PATENT DOCUMENTS

| | | | |
|---|---|---|---|
| 4,911,031 A | | 3/1990 | Yoshimura et al. |
| 5,222,404 A | * | 6/1993 | Stine ......................... 74/335 |
| 5,574,646 A | | 11/1996 | Kawasaki et al. |
| 5,667,052 A | | 9/1997 | Richardson |
| 6,145,398 A | | 11/2000 | Bansbach et al. |
| 6,295,884 B1 | | 10/2001 | Miyake et al. |
| 6,301,984 B1 | | 10/2001 | Petzold |
| 6,428,446 B1 | | 8/2002 | Ohtsuka |
| 6,612,196 B1 | | 9/2003 | Petzold |
| 6,631,651 B2 | | 10/2003 | Petrzik |
| 6,705,175 B1 | | 3/2004 | Klatt |
| 6,935,204 B2 | * | 8/2005 | Walker et al. ............. 74/335 |
| 6,997,075 B2 | | 2/2006 | Serebrennikov et al. |
| 2004/0063541 A1 | | 4/2004 | Berger et al. |

FOREIGN PATENT DOCUMENTS

| DE | 196 10 827 A1 | 9/1997 |
|---|---|---|
| DE | 197 56 637 A1 | 6/1999 |
| DE | 197 56 638 A1 | 6/1999 |

(Continued)

*Primary Examiner*—David D. Le
(74) *Attorney, Agent, or Firm*—Davis Bujold & Daniels, P.L.L.C.

(57) ABSTRACT

A method for controlling operational sequencing of gears in an automatic transmission (102) which has been built in an auxiliary mode. In the case of such a shifting transmission it is possible that during the engagement of its transmission gear stage, impact noises or contact noises are present in the shifting procedure. This can occur by the generation of a tooth-on-tooth positioning between the toothing of a sliding collar (126) and the come-along toothing of an idler gear (130, 132). Provision is made for the control of the activation movement of the sliding collar (126) carried out in such a manner that an activation condition impact of the transmission parts, which are partakers in the shifting associated transmission part onto other transmission parts with the least possible impact force and/or with a least possible impact noise level.

20 Claims, 2 Drawing Sheets

FOREIGN PATENT DOCUMENTS

| | | |
|---|---|---|
| DE | 197 56 639 A1 | 6/1999 |
| DE | 199 07 141 A1 | 8/1999 |
| DE | 199 52 289 A1 | 5/2000 |
| DE | 101 10 663 A1 | 2/2002 |
| DE | 102 34 357 A1 | 7/2003 |
| DE | 102 96 801 T5 | 4/2004 |
| EP | 0 310 387 A2 | 4/1989 |
| EP | 0 723 097 A2 | 7/1996 |
| EP | 1 067 319 A2 | 1/2001 |
| EP | 1 150 040 A2 | 10/2001 |
| EP | 1 271 010 A1 | 1/2003 |
| EP | 1 333 202 A1 | 8/2003 |
| WO | WO-02/32713 A2 | 4/2002 |
| WO | WO-02/061307 A1 | 8/2002 |

* cited by examiner

METHOD FOR THE CONTROL OF OPERATIONAL SEQUENCING IN AN AUTOMATIC TRANSMISSION OF AUXILIARY CONSTRUCTION

This application claims priority from German Application Serial No. 10 2005 011 273.0 filed Mar. 11, 2005.

FIELD OF THE INVENTION

The invention concerns a method for the control of operational sequencing in an automatic transmission of auxiliary construction.

BACKGROUND OF THE INVENTION

An automatic transmission for a motor vehicle is normally designed as a stepped variable transmission, which is operated in auxiliary mode, wherein idler gears and fixed gears on at least one common transmission input shaft as well as on one transmission common output shaft are present and are at least pairwise meshed with one another. For the realization of a specific transmission gear, an idler gear is rotationally fixed on a common transmission shaft by way of a shifting or sliding collar so that torque transfer from a fixed gear to an idler gear can take place. The sliding collar, in this situation, is rotationally fixed as well as axially slidable along the common shaft and, different from a manually shiftable transmission, is energized by way of an actuator apparatus, i.e., a servo motor, which actuator apparatus itself is under the control of a transmission control center. As is well known, such an actuator apparatus can be designed to be energized by hydraulic, pneumatic or electrical power. The control of this type of actuator apparatus is executed with the aid of a program fed by input generated by strategically placed sensors, which signal directly to the control equipment.

In practice, such automatic transmissions have received, in a fully deserved manner, high claims for their control and regulation systems, since these both exhibit and enable a lengthy operational life; provide excellent shifting comfort at a low noise level, and function with short gear change times as well as quick availability when the vehicle has been put into operation.

These favorable requirements subject the control of the transmission, at least in part, to conflicting demands. As an example, the demand for short shifting times leads to comparatively high activation speeds of the actuator apparatus for the sliding collars which, in turn, brings about excessive velocities at a moment of gear contact between idler and fixed gears. Since a sliding collar is usually energized by an actuator apparatus, these two components are bound together by shifting rods and shifting forks, which increases the movable weight of the collar and thereby increases the kinetic energy of the movable parts.

The inevitable result includes comparably high noise levels, which arise from the impact of the respective toothing of the idler gear and the sliding collar and further, understandably, has an influence on the operational life of such a shifting apparatus, which must be ruggedly designed. This leads, in turn, to a high transmission weight and/or at least to increased cost of manufacture.

In order to meet the above stated problem, DE 197 56 637 A1 and DE 197 56 639 A1 propose a shifting apparatus, which has a supported aid for, as before, a multi-stage, stepped, variable transmission of auxiliary construction. This shifting apparatus includes valves and shifting cylinders, wherein pistons are provided which can be displaced by a fluid. In addition, shifting elements are provided wherein, in each shifting group, components of the transmission can be connected to allow torque transfer. This shifting apparatus is also characterized in, that for each shifting group, a provision is made in which the valve, shifting cylinder, piston and shifting element are assembled in one unit. Due to this combined construction, the otherwise customary connection elements between a shifting fork and an actuator apparatus can be eliminated. This elimination of the momentum masses allows that the reaction time is reduced between first, the signal, which releases a gearshift; second, the execution of this shift. Also connected thereto is a reduction of the kinetic energy which is to be brought into the system.

In this combination, the valves are designed as 2/2-way valves and are reactive to changes in pulsed signals. This allows that, during the carrying out of the shifting procedure, a mutual compensation between the force and time of shifting can be undertaken so that severe mechanical noise originating in impacts of toothing between the idler and the sliding collar can be avoided. The area of the problem lies in an actual control of the 2/2-way valves, especially in the case of tooth-to-tooth positioning of the interior toothing of the sliding collar and the complementary toothing of the idler during shifting. The noise also occurs in the case of the collar and idler gears when they release from one another with subsequent through-shifting.

An additional, more conventional shifting apparatus for an automatic transmission is disclosed by DE 102 34 357 A1, wherein even a case of operation is satisfactorily solved in that here tooth-to-tooth positioning is fostered between the inner toothing of the sliding collar and the complementary toothing of the idler. To accomplish this, a springlike, elastic activation means is provided for the sliding collar, which is also a shifting collar whereby, from a single actuator apparatus, the entire predetermined travel for the sliding collar results from the placement of a shifting rod between the elastic actuator apparatus and the sliding collar so that, now with an exact mutual tooth positioning between the collar and the idler gears, noisy mechanical gear engagement is excluded. If the principal shaft of the transmission or a selected gear is rotated, then the reaction must be a spring force supported continuation of the shifting of the selected gear, wherein one spring releases the operative force of the actuator apparatus, which force was not previously converted into a specified control direction. The disadvantage of this shifting apparatus is both the impacting of the respective teeth of the sliding collar and the idler gear and also disturbing shifting noises can be noticed during through-shifting because of the contact of the teeth.

Finally, in DE 196 10 827 A1 a procedure is known for the evaluation of gear tooth noises, especially in the case of transmissions, wherein the manufacture of low-noise tooth-pairs can be advantageously carried out. For the evaluation of the noise of toothing, the speed of rotation of the gear under investigation is measured, and noise attributable to the toothing is picked up by a microphone and both signals are input into a Fast Fourier Transform Analyzer (hereinafter FFT). The FFT analyzer presents an output signal dependent upon the speed of rotation of the gear and valid for a preselected gearsetting.

SUMMARY OF THE INVENTION

The present invention concerns a method for the control of shifting successions in an automatic transmission, which transmission has been made in a auxiliary construction mode. Such a transmission and a shifting arrangement of the kind shown, for instance, can be made in the manner of DE 197 56 637 A1 and DE 197 56 639 A1.

BRIEF DESCRIPTION OF THE DRAWINGS

The invention will now be described, by way of example, with reference to the accompanying drawings in which.

DETAILED DESCRIPTION OF THE INVENTION

Figure 1:
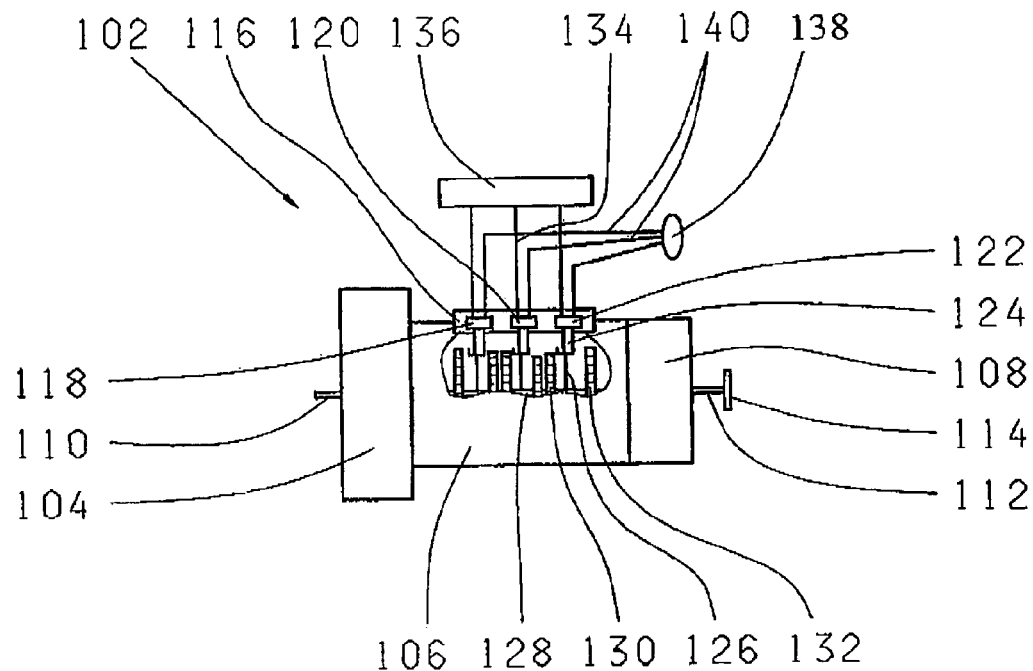
FIG. 1 is a schematic presentation of an automatic transmission with a shifting apparatus.

According to the above, FIG. 1 shows in a schematic presentation, a general transmission assembly 102, having one clutch bell cover 104, a main transmission 106 and an auxiliary transmission 108, as well as having an input drive shaft 110 and an output drive shaft 112 connected to an output drive flange 114. On the main transmission 106 is affixed a component 116, which encompasses three individual actuator apparatuses 118, 120 and 122 for respectively two idle gears 130, 132. The component 116, according to FIG. 2, is fastened to the transmission assembly 102 with the aid of connection element 144.

Figure 2:
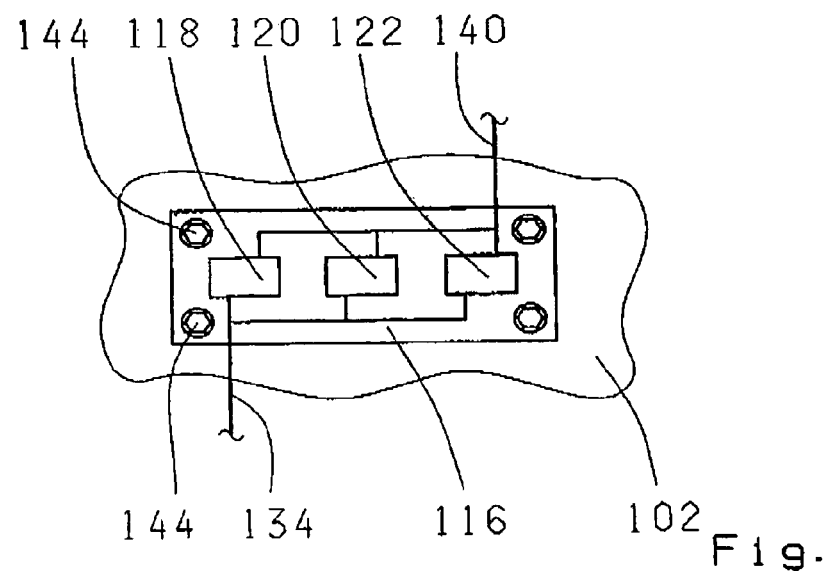
FIG. 2 is an array of three apparatuses in a row.
Figure 3:
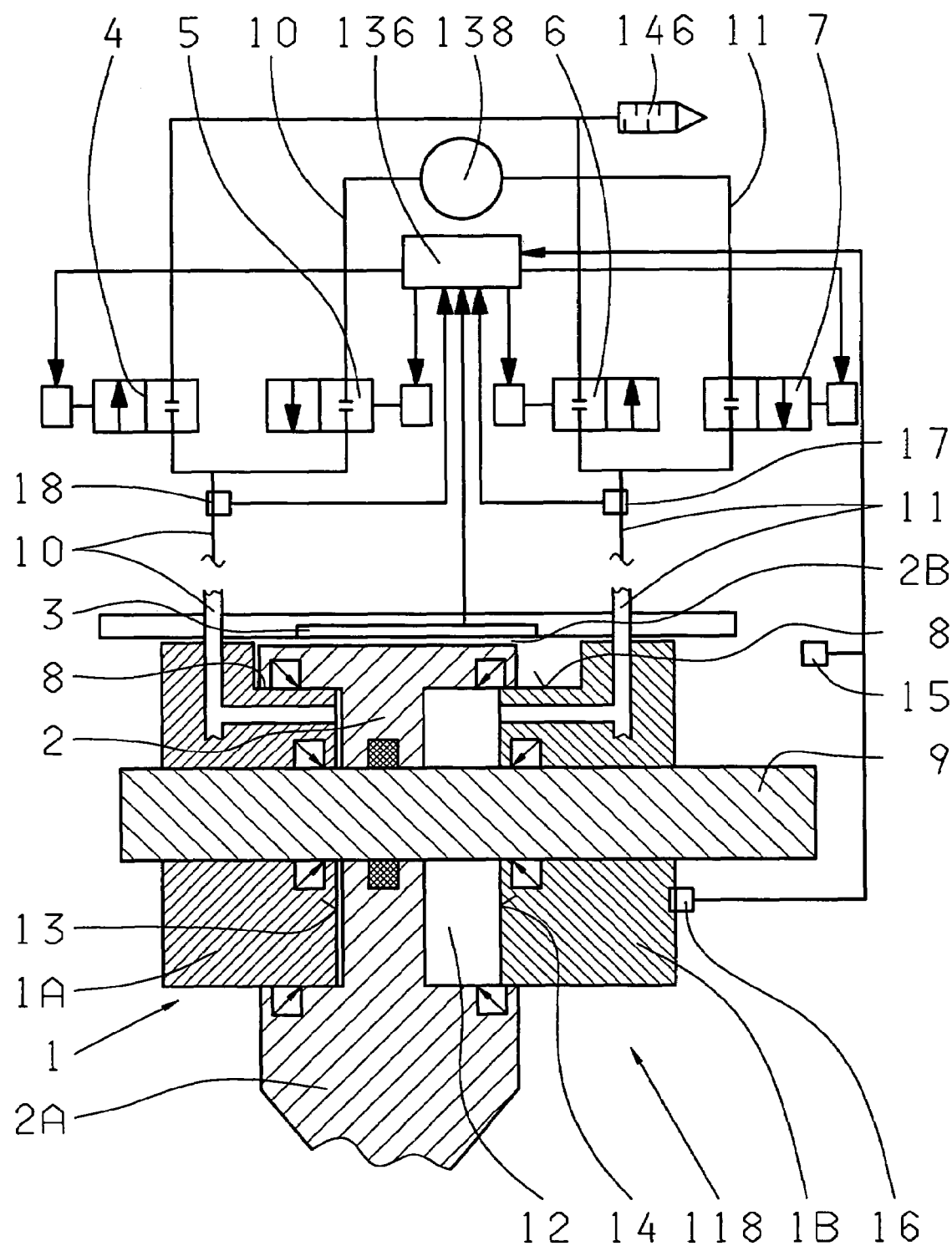
FIG. 3 is a presentation of a shifting apparatus with a circuit scheme for the actuator apparatus with the aid of four 2/2-way valves.

The circuit actuator apparatus 118, which is presented in an exemplary manner in FIGS. 2 and 3 with the help of a shifting fork 124 engages itself in a sliding collar 126, which can be made to slide axially along a shaft 128 to which it is turn-fast secured. By way of impelling this sliding collar 126, this collar can bind either with idler gear 130 or with idler gear 132, whereby a gear stage is shifted into and a torque transfer from the input drive shaft 110 to the output drive shaft 112 becomes possible.

The circuit actuator apparatuses 118, 120, 122 are connected by way of electrical wiring 134 with a control apparatus 136, for example, a computerized transmission control or a vehicle master computer. Additionally, the actuator apparatuses 118, 120 and 122 are electrically connected to a supply apparatus 138 to acquire a pressurized fluid through the lines 140.

FIG. 3 shows the principle of the actuator apparatus 118 for an automatic transmission in a motor vehicle with distance measurement equipment and pulse sensitive multiport valves, shown in longitudinal section. Shown also is a shifting cylinder 1 formed from the cylinder parts 1A and 1B and a shifting piston 2.

The movable masses can be principally reduced by way of a known design of the shifting cylinder 1 disclosed by DE 197 56 637 A1 and DE 197 56 639 A1. Thus, the shifting piston 2 has been designed to function as a hydraulically or pneumatically energized shifting element between these two cylinder parts 1A and 1B, which simultaneously act as a shifting fork. On this account, a separate shifting fork, as well as shifting rods, can advantageously be eliminated.

For the determination of the positioning of the shifting piston 2 in the shifting cylinder 1, according to FIG. 3, its location between the cylinder parts 1A and 2A, a distance instrument 3 is placed parallel to the sliding axis of the shifting piston 2 and is connected to the control apparatus 136. As an example, the design of this distance instrument 3 could advantageously be based on variation of induction vs distance. The control apparatus 136 evaluates the position of the shifting piston 2 and produces signals for the control of the pulse sensitive 2/2-way valves, namely 4, 5 and 6, 7.

The shifting piston 2 possesses a guide detent 2B by means of which, the piston is conducted into a recess 8 which has been excised from both cylinder parts 1A and 1B. Both the cylinder parts 1A and 1B as well as the piston 2 surround a bar 9, which runs through the middle of the cylinder parts 1A and 1B as well as through the shifting piston 2 in the motion direction of the shifting piston.

For a displacement of the shifting piston 2 within the shift cylinder 1, resulting from external pressure source 138 feeding through pressure lines 10, 11, a pneumatic or a hydraulic pressure medium is delivered to the actuator apparatus 118. Interposed in the pressure lines 10 and 11 are, respectively, two pairs of electromagnetically operated, 2/2-way valves, namely 4 and 5 and/or 6 and 7. These valves regulate the through-flow of the pressure medium through the pressure lines 10 and 11 in such a manner that the shifting piston 2 is moved at a predetermined speed, which has been set either by empirical means or by a simulation appropriate to a given point on the distance scale. The method and manner of control of the valves can be made to conform to the masses which are to be shifted. The release of air from the valves 4, 5, 6, 7 is carried out by a noise damper 146.

The pulsation sensitive 2/2-way valves 4, 5 and 6, 7 are designed for long term operation at 4 volts. However, in the present case, these are operated with 24 volt impulses. By the direct control of the valves 4, 5 and 6, 7 with substantial current impulses, the valves react very quickly. In this operation, they are dependent upon the position of the shifting piston 2 in the shift cylinder 1, which position is determined by the distance instrument 3 and controlled by the control apparatus 136. In accordance with the position of the shifting piston 2 differently long electrical impulses were issued to the pulse sensitive valves 4, 5 and 6, 7, whereby these are controlled at a defined high pulse frequency for a rapid piston displacement and with a defined lesser pulse frequency for a slower piston displacement. In this manner, the through-flow of pressure medium, which sets the shifting piston 2 in motion within the shifting cylinder 1 and therewith also the speed of the shifting piston 2 varies during the shifting procedure.

The control of the pulse sensitive valves 4, 5, 6 and 7 is, in this matter, so designed, that all pulse sensitive valves are individually controlled, counter to one another or with one another. Thereby, what is acquired, is that different speeds are available for the shifting piston 2 and therewith also different dynamic forces.

In this way, the shift piston speed, determined by respectively two pulse responsive 2/2-way valves, is varied in such a manner, that the shift piston 2, during its shifting travel up to a start of synchronization of the transmission, is moved with the greatest possible compressive force and high speed and following the termination of the synchronization phase, the piston is brought at a diminished speed into its end position.

If, upon the occurrence of a gearshifting, pressure medium is sent through the line 10 of the actuator apparatus 118, then the pulsation sensitive valve 5, which serves the function of a feed valve, is opened. At the same time, the valve 4, serving as an exit valve, is closed. In this way, pressure fluid enters, through the line 10 through the cylinder part 1A and into a pressure chamber 12 of the shifting cylinder 1 and moves the shifting piston 2 away from its contact surface 13 on the cylinder part 1A in the direction of a contact surface 14 in the cylinder part 1B, which surface 14 lies opposite to the contact surface 13.

Upon the initiation of the synchronization phase in the transmission, the shifting piston 2 dwells briefly in a blocked position, before its impact on the contact surface 14, whereby the application of pressure of the shifting piston 2 substantially increases by way of additional feed of pressure medium in the line 10.

That part of the chamber 12 of the shifting cylinder 1, which lies in the moving direction of the shifting piston 2, finds itself open to release during the entire shifting procedure by way of the pressure line 11 and the open pulsate valve 6, which is now serving as an exit valve. That pulsate sensitive, pressure medium feed valve 7 remains closed at this operation.

At the end of the synchronization procedure, the shifting piston 2 is unblocked, allowing this to set itself in motion in the direction of its end position against the contact surface 14 and, indeed, with greater speed because of the higher pressure which is applied as a result of the synchronization. As this is carried out, the respective position of the shifting piston 2 is determined by the distance instrument 3 which, in turn, by way of electrical impulses controls the pulse sensitive valves 6 and 7 in such a way, that the pulse sensitive valve 6, which serves for deaeration, is closed. This leads to a situation in which a so-called cushion of pressure medium drastically reduces the motion of the shifting piston 2 through the final, short increment of travel to the contact surface 14.

The feed of pressure by way of the pulse sensitive valve 5 into the pressure line 10 is stopped during or at the end of the brief standstill of the shifting piston 2 during the synchronization phase of the transmission by the closure of the feed valve 5.

In order to bring the shifting piston 2 into its end position, in spite of the pressure medium cushion between the shifting piston 2 and the contact surface 14, the pulse sensitive valve 6 is in an opened state, because of controlled reaction to the measured value from the distance instrument 3 directly before the impact of the shifting piston 2 against the contact surface 14, allowing the pressure medium found between the shifting piston 2 and the contact surface 14 to escape. Thus the shifting piston 2 is not repressed thereby in making its impact on the contact surface 14.

A detent, however, will not avoid, a situation wherein the high value of the impact force of the shift piston 2 is dependent from its approach speed and the mass-weight of moving parts of the actuator apparatus 118.

These known actuator apparatuses are, on their own, very advantageous. However, it is not commonly known to what extent the immediate control of the pulse sensitive valve must be carried out in order to create a pressure medium cushion, which is large enough to assure a secure and noise free connection of the toothing of the sliding collar and its idler gear. In this matter, it is to be considered not only the disturbance-free incident of operation, but also the already described problematic tooth-to-tooth positioning of the sliding collar and its idler gear.

It is true that DE 197 56 637 A1 proposes, that to avoid shifting during tooth-to-tooth positioning, the toothing about to be meshed can be subjected monitoring. In such a case, the synchronization force can be minimized to allow the attainment of synchronization and drag torque. A particular drag moment can be found which releases the tooth-to-tooth position. This would be based on values of size and on which procedure severe noise emission would be produced by the synchronization, because of which weight values and with which procedures strong contacting noises from parts of the transmission, i.e., of the shifting apparatus, can be avoided in a shifting succession is not yet described, however.

Given the above background, the purpose of the invention is to present a method with which, in an automatic transmission, the components involved in a shifting or in a disturbance free connection of sliding collars and idlers, as well as in the case of tooth-to-tooth positioning, and including the release of the same from engaged positions, are mechanically stressed as little as possible and the shifting procedure carries itself out as quietly as possible.

The invention concerns a method for the control of the gear succession series in an automatic transmission. This method has been designed for an auxiliary mode of construction with at least one input drive shaft and at least one output drive shaft whereby, on at least these shafts, are installed rotatable idler gears and rotatably fixed gears which, when paired, toothedly engage with one another, thus serving for the formation of gear stages with at least one sliding collar, which is axially slidable and is, on a transmission shaft, proximal to at least one idler gear and by way of a control apparatus, can be conducted so far against the idler gear that the idler can enter into an inner or an outer engagement with the sliding collar in a come-along toothed manner and thereby couple with the sliding collar.

As the above is accomplished, the control of the control center, which carries out the control on the basis of sensor information regarding the operational condition of the transmission, whereby a tooth-on-tooth positioning between the inner or the outer toothing of the sliding collar and the complementary toothing of the idler gear is dissolved, in that these parts are rotated counter to one another. Additionally, the method is thereby characterized in that the control of the activation motion of the controlling apparatus has been carried out in such a way that, an actuated collision against those parts of the transmission against other transmission parts is carried out with a least possible contacting force and with a least possible connection.

A favorable aspect is provided in this matter, in that the regulation of the activation movement of the control apparatus operates in such a manner, so that a regulated impact of the movable part 2 of the positioning apparatus occurs against a contact surface 14, an impact of the exposed face of the inner toothing of the sliding collar and the idler toothing. This is a tooth-to-tooth positioning, an impact of the tooth surfaces on the oppositely situated tooth base (i.e., tooth head-tooth bottom position) of this toothing and/or an impact of another on the shifting partaking transmission part on the transmission housing with the least possible contact force and/or with a least possible meshing noise is carried out.

In a further embodiment of the method, provision can be made, that for the minimizing of the striking force and/or that of the impact noise, the axial position of the detent 14, the tooth-to-tooth positioning, and/or the tooth top to tooth bottom position is determined from one starting position and is saved in memory, and that these positions upon subsequent, similar shift procedures with reduced could-be shift speed, are handled.

For the carrying out of the method, according to the invention, a pressure medium driving mechanism can be used, namely, an electromagnetic actuator apparatus or an electric motor actuator apparatus. For the determination of the least possible impact force and/or the lowest possible contact noise, for example, measurements may be made of the speed of rotation of the servomotor and/or the activation path of the movable parts of the actuator apparatus of the sliding collar 126. Such a movable part of the actuator apparatus 118 can be, for example, the shifting piston 2.

Further, provision can be made that for the determination of the least possible impact force and or the least possible noise generation of the current curve of the voltage and/or that of the current of the electromotor or of the electromagnetically related designed actuator apparatus can be measured and taken into consideration.

As an expanding development or alternative to this, provision can be made for the determination of the least possible impact force and/or the least possible impact noise, the activation speed and/or the activation acceleration of the movable part 2 of the actuating apparatus 118 or the sliding collar 126 can be measured and given consideration.

Additionally, it is possible for the determination of the air carried part of the impact noise or for the bodily carried noise of a part of the actuation apparatus 118 is, for example, the cylinder part 1A, that is also 1B of the adjustment cylinder 1.

Alternatively or additively to the previously mentioned measurement values, provision can be made that for the determination of the least possible impact force and/or the least possible impact noise measurements may be made and consideration given to the pressure circuit of the pressure medium in a cylinder chamber 12 of the shifting cylinder 1 of the actuator apparatus 118 during its course of operation.

For the evaluation of the above. the measured values, especially for the determination of the least possible impact force and/or the least possible impact noise, according to one variation of the invention, provision is made that the frequency spectrum of the impact noise or the pressure run or the curve of the electrical voltage and/or the electrical current of the electromotor or electromagnetic actuator apparatus be analyzed by FFT analysis (Fast Fourier Function).

In accord with an additional variation of the invention, provision is made that or the movement of the sliding collar 126, a hydraulic or a pneumatic actuator apparatus 118 can be used, which itself is controlled by four, pulse sensitive, 2/2-way valves, namely 4, 5, 6 and 7 for the control and regulation of the activation movement of its positioning piston 2. It is also possible, however, that there are also two electromagnetically activated proportional valves to be used.

Finally, the method can be thereby characterized, in that for the determination of the least possible impact force and/or the least possible impact noise of the pressure of the pressure means, the electrical control current or the electrical voltage of the adjustment apparatus can be so installed, that a more secure mechanical coupling between the sliding collar and the free valve during a minimum mineral impact noise, for example, after the release of a tooth-to-tooth positioning is realized.

A shifting apparatus for the carrying out of this method possesses in a further development of the state of the technology, in accordance with FIG. 3, that at least additionally one sound sensor, which is to serve as an air noise sensor 15 and/or a bodily noise sensor 16 be designed and be placed in or on the transmission and electrically bound to the control apparatus 136. In FIG. 3, the bodily noise sensor 16 is placed on the cylinder part 1B.

Additively or alternately thereto, it is possible that such an auxiliary 118, at least a pressure sensor 17, 18 can be placed in the pressure lines 10, 11, which lead to the pressure chamber 12. These pressure sensors 17, 18 are, likewise, bound to the control apparatus 136 in a signal technological manner.

The values of the speed of the activation and the activation acceleration of the shift piston 2 allow themselves to deviate outside of the time based curve of the distance measuring signal of the distance measuring device.

| | Reference numerals |
|---|---|
| 1 | shifting cylinder |
| 1A | cylinder part |
| 1B | cylinder part |
| 2 | shifting piston |
| 2A | shifting fork |
| 2B | guide detent |
| 3 | distance instrument |
| 4 | pulse sensitive 2/2-way valve |
| 5 | pulse sensitive 2/2-way valve |
| 6 | pulse sensitive 2/2-way valve |
| 7 | pulse sensitive 2/2-way valve |
| 8 | recess |
| 9 | bar |
| 10 | pressure line |
| 11 | pressure line |
| 12 | pressure chamber |
| 13 | contact surface |
| 14 | contact surface |
| 15 | air noise sensor |
| 16 | bodily noise sensor |
| 17 | pressure sensor |
| 18 | pressure sensor |
| 102 | transmission assembly |
| 104 | bell cover |
| 106 | main transmission |
| 108 | auxiliary transmission |
| 110 | input drive shaft |
| 112 | output drive shaft |
| 114 | output drive flange |
| 116 | component |
| 118 | actuator apparatus |
| 120 | actuator apparatus |
| 122 | actuator apparatus |
| 124 | shifting fork |
| 126 | sliding collar |
| 128 | shaft |
| 130 | idler gear |
| 132 | idler gear |
| 134 | electrical wiring |
| 136 | control apparatus |
| 138 | supply apparatus |
| 140 | lines |
| 144 | connection element |
| 146 | noise damper |

The invention claimed is:
1. A method for controlling operational sequencing in an automatic transmission (102) of an auxiliary design, with at least one input drive shaft (110) and at least one output drive shaft (112), and including on the input and the output drive shafts (110, 112) rotationally supported idler gears (130, 132) and fixed gears which serve for formation of gear stages when meshed with one another in tooth engagement, with at least one sliding collar (126) which is axially slidable and fixed to a transmission shaft (128), adjacent at least one idler gear (130, 132) and can be axially movable toward the idler gear (130, 132) by an actuator apparatus (118, 120, 122) so that a toothing engagement of the sliding collar (126) with a come-along toothing of the idler gear (130, 132) meshes, control of the actuator apparatus (118, 120, 122) for moving the sliding collar (126) is effected by a regulating component of a control center (136), control action being based on data from sensor information regarding an operational state of the transmission (102), and by which tooth-to-tooth positioning between toothing of the sliding collar (126) and the come-along toothing of the idler (130, 132) is thereby released, so that the toothing of the sliding collar (126) and the come-along toothing of the idler (130, 132) reference one another, the method comprising the steps of:

providing the transmission (102) with a piston distance instrument (3) for determining a position of a shifting piston (2), during a shifting procedure, and coupling the piston distance instrument (3) to the control center (136) for providing sensed information thereto;

providing the transmission (102) with at least one other sensor (15, 16, 17, 18) and coupling the at least one other sensor (15, 16, 17, 18) to the control center (136)) for providing sensed information thereto, wherein the at least one other sensor (15, 16, 17, 18) is one of an air noise sensor and a bodily noise sensor; and controlling an activation motion of the actuator apparatus (118, 120, 122), during the operational sequencing of the automatic transmission (102), based upon sensed information received from both the piston distance instrument (3) and the at least one sensor (15, 16, 17, 18) so as to minimize an impact force and impact noise of transmission parts, involved in the shifting procedure, upon other transmission parts, whereby shifting noise and mechanical stressing of the transmission parts involved during the shifting procedure are minimized.

2. The method according to claim 1, further comprising the step of controlling activation motion of the actuator apparatus (118, 120, 122) such that a conditioned impact of the shifting piston (2) of the actuator apparatus against at least one detent (14), an impact of end faces of the toothing of the sliding collar (126) and the come-along toothing of the idler (130, 132 tooth on tooth positioning), an impact of tooth heads, on an oppositely situated tooth bottom (tooth head-tooth base) of this toothing and an impact of another on the shifting participating transmission part on a transmission housing occurs with a smallest possible impact force and with a smallest possible impact noise.

3. The method according to claim 1, further comprising the step of, beginning at a starting position, determining and storing at least one of an axial position of the impact, a tooth-on-tooth position and a tooth head-tooth base position, and carrying out the determined and stored position with a lower actuator apparatus speed.

4. The method according to claim 1, wherein the at least one of the actuator apparatus (118, 120, 122) is servo motor and the method further comprising the step of measuring at least one of a rotational speed of the servo motor, an activation path of the shifting piston (2) of the actuator apparatus (118, 120, 122) and of the sliding collar (126) to determine at least one of the least possible impact force and the least possible impact noise.

5. The method according to claim 1, further comprising the step of measuring at least one of an activation speed and an activation acceleration of the shifting piston (2) of the actuator apparatus (118, 120, 122) or the sliding collar (126) to determine at least one of the least possible impact force and the least possible impact noise.

6. The method according to claim 1, further comprising the step of measuring at least one of air borne sound of the impact noise or a bodily transmission of a part (1A, 1B, 2) of the actuator apparatus (118, 120, 122), the sliding collar (126) or a transmission housing to determine at least one of the least possible impact force and the least possible impact noise.

7. The method according to claim 1, further comprising the step of measuring at least one of a pressure curve of a pressure medium in a pressure chamber (12) of a shift cylinder (1) of the actuator apparatus (118, 120, 122) during an active role to determine at least one of the least possible impact force and the least possible impact noise.

8. The method according to claim 1, further comprising the step of measuring a frequency spectrum of the impact noise for the impact force determination.

9. The method according to claim 1, further comprising the step of using one of a hydraulic and a pneumatic activated actuator apparatus (118, 120, 122), which is controlled by one of four 2/2-way valves (4, 5, 6, 7) or by two proportional valves, for the control and regulation of activation movement.

10. The method according to claim 1, further comprising the step of adjusting at least one of a pressure of a pressure medium, an electrical current, and an electric voltage of the actuator apparatus (118, 120, 122) for achieving a secure mechanical coupling, between the sliding collar (126) and the idler (130, 132), with minimal impact noise following a release of a tooth-on-tooth position to determine at least one of the least possible impact force and the least possible impact noise.

11. The method according to claim 1, further comprising the step of connecting at least one valve, which controls movement of the shifting piston (2), to a noise damper for reducing a sound generated by fluid passing through the at least one valve.

12. The method according to claim 1, further comprising the step of controlling at least one pulse sensitive valve so as to create a fluid pressure medium cushion which is sufficient to assure a secure and noise free connection of the toothing of the sliding collar (126) with the come-along toothing of the associated idler gear (130, 132).

13. The method according to claim 1, further comprising the step of driving the actuator apparatus (118, 120, 122) by at least one of a pressure medium, an electromagnetic force and an electric motor.

14. The method according to claim 13, wherein the at least one of the actuator apparatus (118, 120, 122) is one of an electromotor and a electromagnetic designed actuator apparatus and the method further comprising the step of measuring at least one of a time related duration of voltage and a current of the electromotor or the electromagnetic designed actuator apparatus to determine at least one of the least possible impact force and the least possible impact noise.

15. A method for controlling an operational sequencing of an automatic transmission (102) of an auxiliary design having at least one input drive shaft (110) and at least one output drive shaft (112) and having at least two rotationally supported idler gears (130, 132) and fixed gears on the input and the output drive shafts (110, 112) which serve for formation of gear stages upon meshing engagement with one another, at least one sliding collar (126) being axially slidable and fixed to a transmission shaft (128), adjacent at least one idler gear (130, 132) and being axially movable toward the idler gear (130, 132) by an actuator apparatus (118, 120, 122) so that a toothing of the sliding collar (126) engages a mating toothing of the idler gear (130, 132), and control of the actuator apparatus (118, 120, 122) being effected by a regulating component of a control center (136) and being based on data from sensor information regarding an operational state of the transmission (102), and by which tooth-to-tooth positioning between the sliding collar (126) and the idler gear (130, 132) is released, so that the toothing of the sliding collar (126) and the toothing of the idler gear (130, 132) reference one another, the method comprising the steps of:

providing the transmission (102) with a piston distance instrument (3) for determining a position of a shifting piston (2), during a shifting procedure, and coupling the piston distance instrument (3) to the control center (136) for supplying sensed information thereto;

providing the transmission (102) with at least a first sensor (15, 16) and coupling the at least first sensor (15, 16) to the control center (136)) for supplying sensed information thereto, wherein the at least first sensor (15, 16) is one of an air noise sensor and a bodily noise sensor;

providing the transmission (102) with at least a second sensor (17, 18) and coupling the at least second sensor (17, 18) to the control center (136)) for supplying sensed information thereto, wherein the at least second sensor (15, 16, 17, 18) is a pressure sensor for sensing an actuation pressure; and controlling of an activation motion of the actuator apparatuses (118, 120, 122) during the operational sequencing of the automatic transmission (102) based upon the sensed information received from the piston distance instrument (3) and the at least first and second sensors (15, 16, 17, 18), so as to minimize an impact force and impact noise of transmission parts, involved in the shifting procedure, upon other transmission parts whereby shifting noise and mechanical stressing of the transmission parts involved during the shifting procedure are minimized.

16. The method according to claim 15, further comprising the step of connecting at least one valve, which controls movement of the shifting piston (2), to a noise damper for reducing a sound generated by fluid passing through the at least one valve.

17. The method according to claim 15, further comprising the step of controlling at least one pulse sensitive valve so as to create a fluid pressure medium cushion which is sufficient to assure a secure and noise free connection of the toothing of the sliding collar (126) with the come-along toothing of the associated idler gear (130, 132).

18. A method for controlling an operational sequencing of an automatic transmission (102) of an auxiliary design having at least one input drive shaft (110) and at least one output drive shaft (112) and having at least two rotationally supported idler gears (130, 132) and fixed gears on the input and the output drive shafts (110, 112) which serve for formation of gear stages upon meshing engagement with one another, at least one sliding collar (126) being axially slidable and fixed to a transmission shaft (128), adjacent at least one idler gear (130, 132) and being axially movable toward the idler gear (130, 132) by an actuator apparatus (118, 120, 122) so that a toothing of the sliding collar (126) engages a mating toothing of the idler gear (130, 132), and control of the actuator apparatus (118, 120, 122) being effected by a regulating component of a control center (136) and being based on data from sensor information regarding an operational state of the transmission (102), and by which tooth-to-tooth positioning between the sliding collar (126) and the idler gear (130, 132) is released, so that the toothing of the sliding collar (126) and the toothing of the idler gear (130, 132) reference one another, the method comprising the steps of:

providing the transmission (102) with a piston distance instrument (3) for determining a position of a shifting piston (2), during a shifting procedure, and coupling the piston distance instrument (3) to the control center (136) for supplying sensed information thereto;

providing the transmission (102) with a first sensor (15) and coupling the first sensor (15) to the control center (136)) for supplying sensed information thereto, wherein the first sensor (15) is an air noise sensor;

providing the transmission (102) with a second sensor (16) and coupling the second sensor (16) to the control center (136)) for supplying sensed information thereto, wherein the second sensor (16) is a bodily noise sensor;

providing the transmission (102) with a third sensor (17) and coupling the third sensor (17) to the control center (136)) for supplying sensed information thereto, wherein the third sensor (17) is a first pressure sensor for sensing an actuation pressure being supplied to the shifting piston (2); and providing the transmission (102) with a fourth sensor (18) and coupling the fourth sensor (15) to the control center (136)) for supplying sensed information thereto, wherein the fourth sensor (18) is a second pressure sensor for sensing an actuation pressure being discharged from the shifting piston (2);

controlling of an activation motion of the actuator apparatuses (118, 120, 122) during the operational sequencing of the automatic transmission (102) based upon the sensed information received from the piston distance instrument (3) and the first, the second, the third and the fourth sensors (15, 16, 17, 18), so as to minimize an impact force and impact noise of transmission parts, involved in the shifting procedure, upon other transmission parts whereby shifting noise and mechanical stressing of the transmission parts involved during the shifting procedure are minimized.

19. The method according to claim 18, further comprising the step of connecting at least one valve, which controls movement of the shifting piston (2), to a noise damper for reducing a sound generated by fluid passing through the at least one valve.

20. The method according to claim 18, further comprising the step of controlling at least one pulse sensitive valve so as to create a fluid pressure medium cushion which is sufficient to assure a secure and noise free connection of the toothing of the sliding collar (126) with the come-along toothing of the associated idler gear (130, 132).

* * * * *